United States Patent [19]
Goetzinger et al.

[11] 3,890,644
[45] June 17, 1975

[54] HEAD MOUNTING ASSEMBLY FOR READING AND WRITING ON BANK PASSBOOKS AND THE LIKE

[75] Inventors: Gunther R. Goetzinger, Detroit; Hilliard R. Di Veto, Plymouth, both of Mich.

[73] Assignee: Burroughs Corporation, Detroit, Mich.

[22] Filed: Oct. 29, 1973

[21] Appl. No.: 410,709

[52] U.S. Cl. .................... 360/101; 360/2; 360/107; 360/109
[51] Int. Cl. G11b 21/02; G11b 21/24; G11b 21/18
[58] Field of Search ............... 360/2, 101, 104–109; 35/35 C

[56] References Cited
UNITED STATES PATENTS
2,961,494  11/1960  Darou et al. ..................... 360/104
3,412,483  11/1968  Jacobs ................................ 360/2

*Primary Examiner*—Bernard Konick
*Assistant Examiner*—Robert S. Tupper
*Attorney, Agent, or Firm*—Edwin W. Uren; Edward G. Fiorito; Paul W. Fish

[57] ABSTRACT

Relates to apparatus for automatically reading from and writing upon relatively thick documentary or multi-page material, such as bank passbooks and the like, and particularly with regard to magnetic data storing stripes secured to covers or other surface portions of such material. The mechanism includes a magnetic transducing read/write head arranged to compressingly and rotatably engage the magnetic stripe uniformly irrespective of the topographical contours thereon and either magnetically read from or write data thereupon as it is moved along the stripe.

23 Claims, 8 Drawing Figures

HEAD MOUNTING ASSEMBLY FOR READING AND WRITING ON BANK PASSBOOKS AND THE LIKE

CROSS REFERENCE TO A RELATED APPLICATION

The present invention is related to and is disclosed but not claimed in U.S. Pat. No. 3,803,388 entitled "Automatic Reading and Writing Mechanism For Bank Passbooks And The Like" such patent having issued on Apr. 9, 1974 to Albert C. williamson, Gunther R. Goetzinger and Hillard R. Diveto and assigned to the assignee of the present invention.

BACKGROUND OF THE INVENTION

1. Field of the Invention

The invention relates generally to transducing equipment for magnetically recording and sensing information on documentary material and particularly to the transducing head portion thereof for performing the transducing functions on relatively thick, compressible documents, such as bank passbooks and the like.

2. Description of the Prior Art

Identification instrumentalities such as credit cards, bank passbooks and the like are of common knowledge and in widespread use and have been generally issued to customers of financial institutions, such as banks, to provide identification as well as efficient service and to maintain accurate financial transactions between the customers and the institution. Accounting equipment has been designed to accept bank passbooks for making accounting entries therein and exemplary thereof is the accounting machine disclosed in the U.S. Pat. to Racz No. 2,468,408 (FIGS. 4, 24 and 25) of common ownership herewith. To protect as well as to speed up financial transactions between the customers and the institution, magnetic stripes have been bonded to or printed upon relatively thin bank checks and ledger sheets and the like in such a manner that the payee's name and account number are both visible to the eye and machine writable and readable.

However, where thicker and more compressible documentary material is concerned, such as multi-page bank passbooks and the like having relatively thick protection covers, a problem arises by reason of the requirement that the transducing tip of a magnetic read/write head to be moved into physical contact with the magnetic material in order to assure complete and strong signal sensing and writing of data thereon.

In view of the difficulties described above, it is evident that an improvement is needed which will overcome this problem and at the same time minimize the unavoidable effect of wear to the transducing heads and to thereby extend their lifetime usefulness. It is also apparent that for thick, compressible record media it is necessary to provide continuous substantially uniform contact between the magnetic head and the stripe during transducing operations regardless of any axial or lateral contour irregularities in the passbook.

SUMMARY OF THE INVENTION

It is accordingly an important object of the invention to provide an improved method of and apparatus for machine reading of data carried on relatively thick, compressible materials and more specifically on the covers of multi-page books such as bank passbooks and the like.

Another important object of the invention is to provide an accurate and reliable method of and apparatus for transducing information from a magnetic stripe carried on relatively thick, compressible documentary material, while assuring strong transduced signals even as wear occurs.

It is another important object of the invention to provide improved apparatus for machine reading of and writing upon magnetic stripes secured to the covers of bank passbooks, and which assures that the transducing head of the apparatus applies a continuous substantially uniform rubbing action on the magnetic stripe as relative movement occurs between the head and the magnetic stripe regardless of the in-line or lateral contours of the latter.

In carrying out the above listed objects, the present invention contemplates an improved apparatus for sensing magentic impulses from or for recording such impulses upon a magnetic stripe, the stripe being secured to the covers of a passbook or the like such as to require actual engagement of the transducing head with the stripe as relative movement occurs therebetween. The present invention assures satisfactory transducement of data between the head and the magnetic material on the stripe by automatically and properly positioning the stripe with respect to the path of travel of the head and by self-adjusting the compressible engagement of the head with the stripe with the same degree of pressure throuogut the movement of the head along the stripe as in-line or transverse contours are encountered thereon. More specifically, as illustrated herein, the magnetic stripe is secured to the cover of a bank passbook, or other similar financial bookkeeping instrument, so that its longitudinal axis extends, when ready by the transducing read head, generally coextensive with the path of travel of the latter.

To provide the desired orientation of the magnetic stripe to the path of travel of the magnetic head, the transducing apparatus of which the head is a part is provided with an abutting wall or edge guide with which one edge of the cover of the passbook bearing the stripe is brought into contact. The magnetic head is mounted for travel in the illustrated embodiment of the invention in parallel relationship with this edge guide such that the longitudinal axis of the stripe extends colinear to the path of travel of the head. A feature of the transducing apparatus is that the transducing head is yieldingly forced into engagement with the magnetic stripe and maintained under pressure therewith as the head is activated over the stripe even when longitudinally extending surface irregularities are encountered.

Another feature of the invention is the provision of a limited swiveling motion imparted to the head which enables it to accommodate itself to any transversely extending surface irregularities in the stripe.

These and other objects, advantages and aspects of the present invention will be more clearly understood from the following description of the drawings, specification and appended claims.

BRIEF DESCRIPTION OF THE DRAWINGS

FIG. 3 is a partial view of a corner portion of a bank passbook illustrating a magnetic stripe patch thereon extending parallel to one edge of the passbook;

FIG. 7 is an isolated view in side elevation of the head mounting assembly for the magnetic transducing head; and FIG. 8 is a detail view of means for adjusting the magnetic transducing head so as to align its direction of travel over the magnetic stripe precisely perpendicular to the magnetized data bits recorded on the latter.

DESCRIPTION OF A PREFERRED EMBODIMENT

Figure 1:
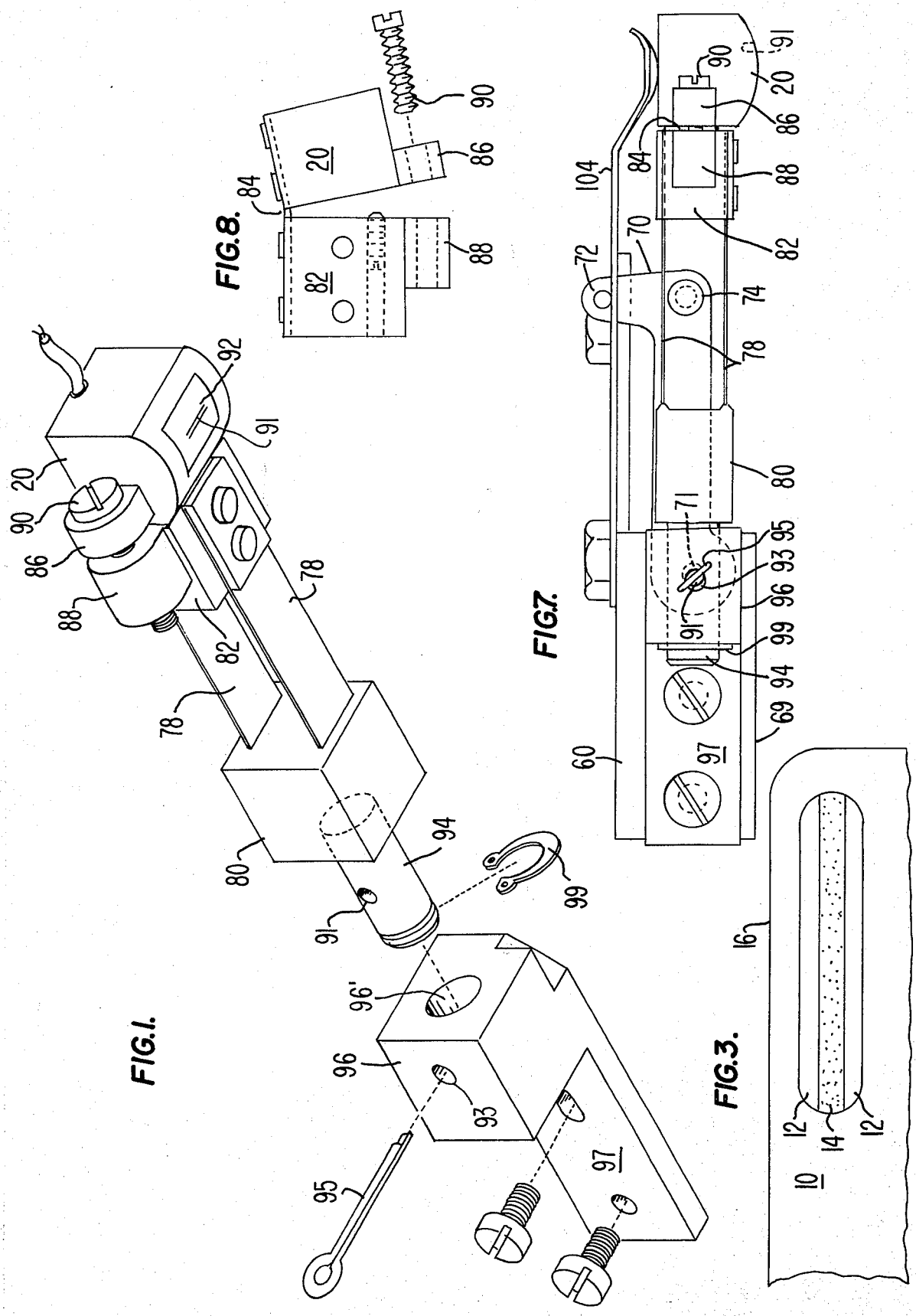
FIG. 1 is an exploded perspective view of a head mounting assembly effective for self-adjusting an attached transducing head to the topographical irregularities of a magnetic stripe patch.

Referring to the drawings wherein like reference characters designate similar or identical elements in the Figures, and with intitial reference to FIG. 3, there is shown a corner portion of a record medium 10, such as a bank passbook, to which is affixed a magnetic stripe label or patch 12, the construction of which will be described in more detail hereinafter and which is similar to that described in the U.S. Pat. No. 3,753,255 of Hilliard R. DiVeto, said patent being assigned to the assignee of the present invention. The magnetizable data storing section of the patch 12 is indicated at 14 where a narrower upper layer of the patch 12 is shown in close proximity to the leading edge 16 of the passbook and extending parallel thereto. This magnetic stripe 14 provides the recording area where stored magnetic information such as account number, balance and passbook line number are recorded.

Figure 2:
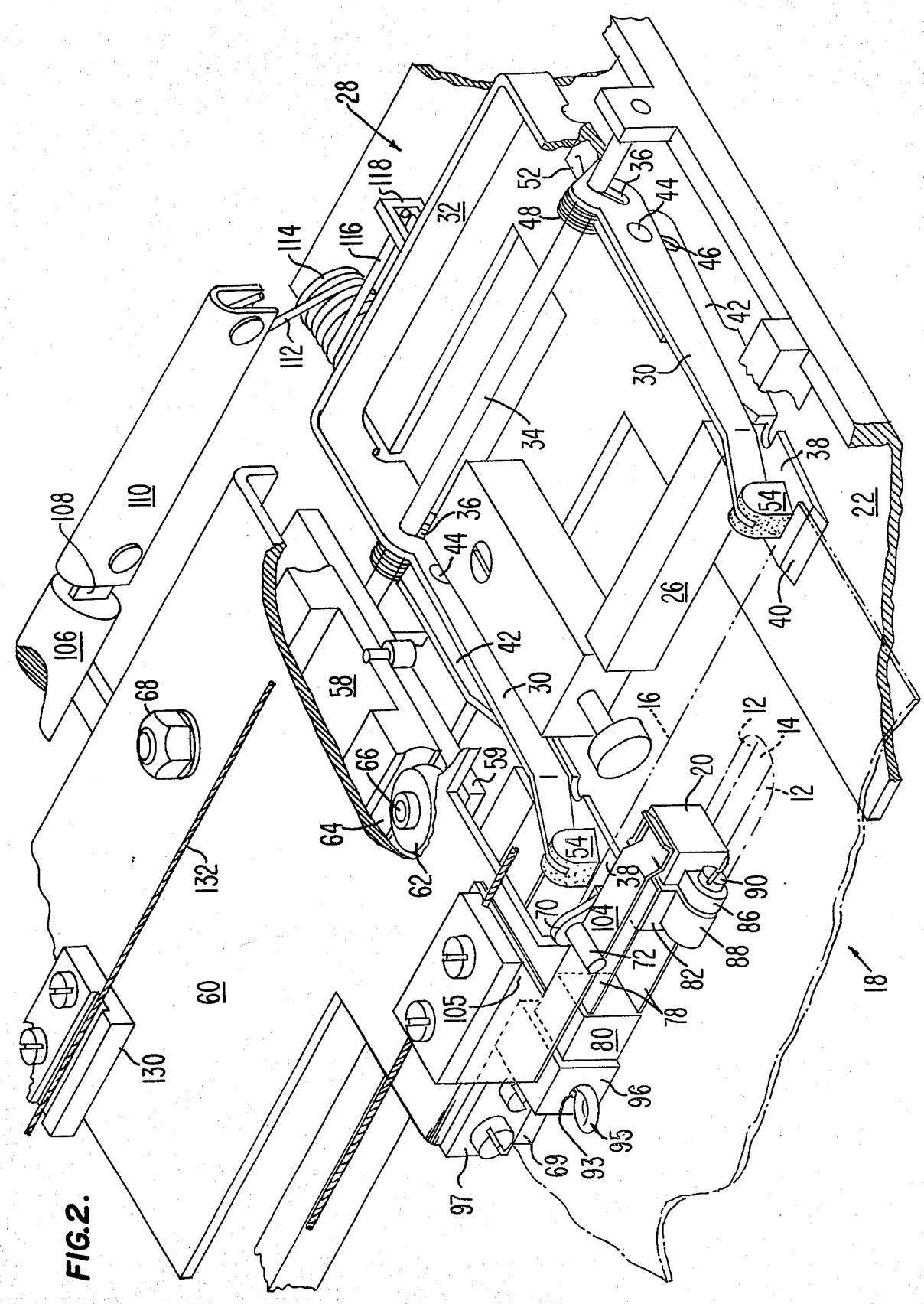
FIG. 2 is a schematic perspective view, partly broken away in section, of a magnetic read/write station for the head mounting assembly illustrating the major operating components of the station and in dotted outline the reception therein of a bank passbook bearing a magnetizable data recording stripe.

A magnetic read/write station generally indicated at 18 in FIG. 2 is so constructed as to be adjustable to accept the covers of variously dimensioned passbooks To compemsate for the different thicknesses of passbooks and to assure the accurate transducing of data between a magnetic transducing head 20 and the magnetic stripe 14 of an introduced passbook, the transducing head 20 is resiliently and rotatably mounted such that it may be pressed into contact with the magnetic stripe 14 of the patch 12 for the major portion of its predetermined path of travel, and such that it will accommodate itself to surface irregularities that it encounters in the stripe. In the following description it will be noted that the patch 12 is secured or bonded to the passbook 10 in such manner that when the book is properly placed in the read/write station 18, the magnetic stripe 14 carried by the patch 12 will align with the path of travel of the transducing head 20.

As described in the aforesaid Williamson et al. U.S. Pat. No. 3,803,388 and as shown in the schematic view of FIG. 2, the read/write station 18 includes, in general, a support or base plate 22 upon which the magnetic transducing head 20 is mounted for to and fro movement over the magnetic stripe 14. The base plate 22 may be shaped along its forward edge to form an entrance or mouth for the leading edge of a passbook, and engageable with the leading edge is a gripper mechanism for properly positioning the leading edge and the magnetic stripe 14 with reference to an edge guide forming a part of the mouth. To this end, the gripper mechanism is so constructed as to provide a compound motion, serving first to grip the leading edge 16 of the passbook and to then move the passbook in a retracting direction to thereby abut its leading edge firmly against an edge guide or bar 26. The edge guide or bar 26 is interrupted for part of its length to permit the protrusion of certain operating elements of the gripper mechanism therethrough and beyond its front face for gripping the leading edge of the passbook. The dimensions of the mouth should be large enough to accommodate passbooks of various sizes and styles, such as are described in the aforesaid referenced DiVeto U.S. Pat. No. 3,753,255. Thus, as a result of the accommodation provided by the mouth, and the operating elements associated therewith, when a passbook is fully inserted thereinto, it will be positioned to locate the patch 12 and particularly its magnetic stripe 14 in an engageable and transducing relationship with the magnetic read/write head 20.

The passbook gripper mechanism, as described in the above referenced Milliamon et al, comprises, in general, a U-shaped member generally indicated at 28 in FIG. 2, including two generally parallel arms 30—30 of similar construction connected at the closed end of the U by a cross member 32. The U-shaped member 28 forms the upper jaw of the gripper mechanism and is both pivotally and translatably mounted on a rod 34 extending crosswise of the member through aligned slanting slots 36—36 formed in the arms 30—30, the rod 34 being suitably mounted on supports at the outer extremities thereof.

Figure 4:
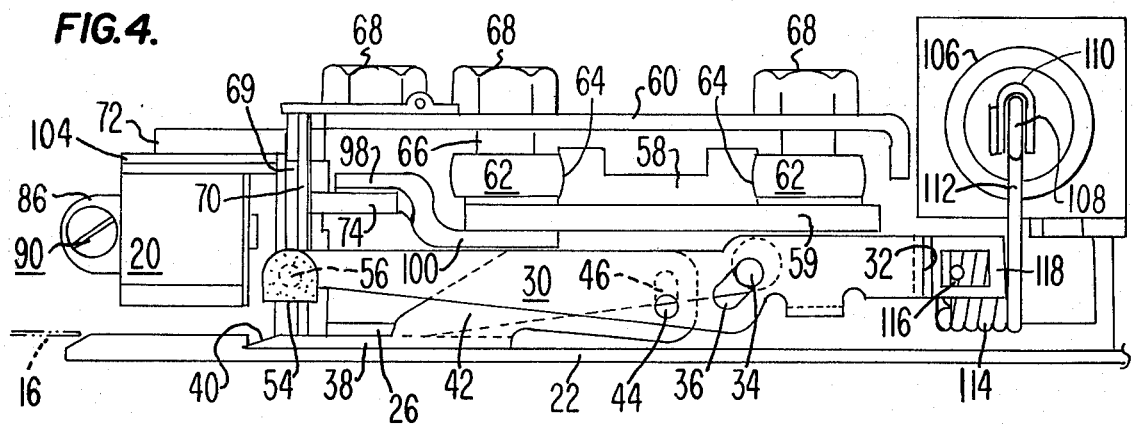
FIG. 4 is a side view of the read/write station illustrating the opened position of a passbook gripper mechanism and showing the leading edge of a passbook approaching the jaws of the gripper mechanism.
Figure 5:
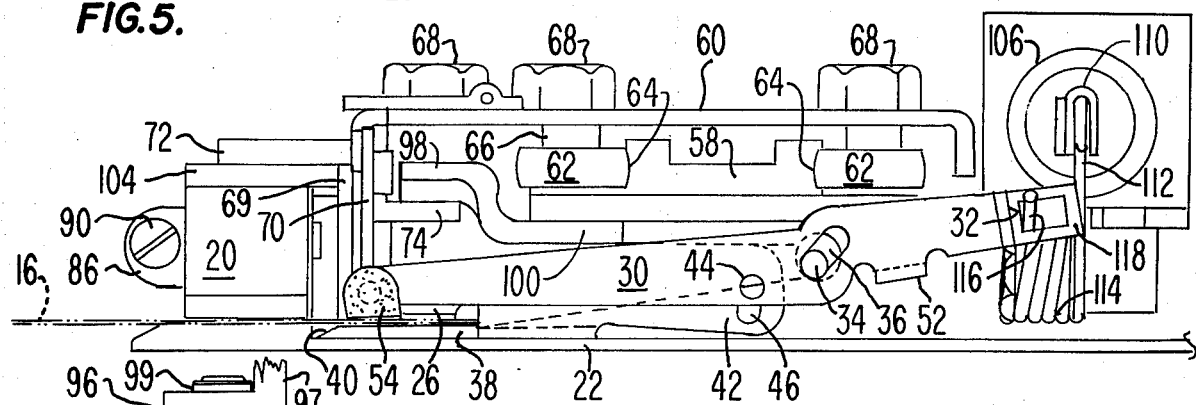
FIG. 5 is a view similar to that of FIG. 4 and illustrating the closed position of the gripper mechanism with the leading edge of the passbook gripped by the gripper jaws and further showing the transducing head in engagement with the magnetic stripe.

Cooperating with the outer ends of the arms 30—30 of the upper jaw of the gripper mechanism is a lower jaw composed of two similarly constructed paddle-shaped elements 38—38. These two elements lie underneath the extremities of the arms 30—30 and are preferably beveled as at 40 to provide slanting faces up which the leading edge 16 of a passbook may be guided. Each paddle-shaped element 38 is provided with a rearward extension which inwardly of its paddle end is L-shaped in cross section to provide a vertical section 42 extending along side of its associated arm 30 and to which it is loosely pivotally connected by a stud 44. To prevent the bottom jaw elements from rising vertically with the upper jaw, each stud 44 extends through a vertical slot 46 as best shown in FIGS. 4 and 5 so that the upper jaw may be rocked about the pivot rod 34 without imparting vertical movement to the lower jaw. However, such rocking movement of the upper jaw will serve to impart a horizontal retractible movement to the lower jaw, as will be more fully described hereinafter. A spring wire 48 is associated with each vertical section 42 of the lower jaw for holding the same down against the base plate 22. The intermediate portion of the spring wires 48 are coiled several turns about the rod 34, one extremity of each wire resiliently pressing downwardly against its associated paddle element 38 as indicated at 50 in FIG. 6, and its opposite extremity bearing against a lateral flange 52 on the adjacent arm of the upper jaw. Each spring wire is of sufficient strength to hold the lower jaw downwardly against upward movement during the rocking motion of the upper jaw.

Carried on the outer extremity of each arm 30 of the upper jaw component of the gripper assembly is a gripper in the form of a shoe 54 of resilient material, such as rubber, which may be cast thereon and provided with an integral portion thereof which enters a hole through the end of the arm such as shown in dotted outline in FIGS. 4 and 5 for interlocking engagement thereof. Each shoe 54 depends below the end of its arm 30 and will engage the leading edge portion of the passbook following its insertion between the upper and lower jaw members. The shoes 54—54 will be slightly compressed as they engage the leading edge of the passbook and their high frictional characteristic will aid in drawing the leading edge of the passbook fully against the stop bar 26, as will be more fully described hereinafter.

Superposing the gripper mechanism 28 of the read/write station is a track member 58, a portion of which is shown in FIG. 2, and end views are shown in FIGS. 4 and 5. The track member 58 extends transversely over the arms 30—30 of the gripper mechanism and also leftwardly thereof as viewed in FIG. 2, and may be supported as shown by an interior frame member 59. A carraige whose supporting plate is indicated at 60 is mounted for travel on the track member 58 and for this purpose it is provided with three triangularly positioned rollers 62, two of which are shown on opposite sides of the track member 58 in FIGS. 4 and 5. Preferably, the periphery of the rollers are convexly rounded as shown and ride in concavely shaped grooves 64 of the same radius of curvature formed in the opposite parallel side edges of the track member 58. Each roller 62 is mounted upon the carriage plate 60 in any suitable manner such as by the provision of a bolt 66 extending through the plate and carrying a nut 68 on the upper surface of the plate.

Depending from the forward edge of the carriage plate 60 and in a vertical plane approximately intersecting the shoes 54—54 of the gripper mechanism is a cutaway lip 69 of the carriage plate 60, as best illustrated in FIGS. 2 and 7, such lip 69 serving to pivotally support, on the inside surface thereof, a lever 70 carrying on the forward side thereof an outwardly projecting pin 72 and on the rearward side an inwardly projecting pin 74, the lever 70 being pivotally connected to the lip 69 by means of a pin 71. The lever 70 with its pins 72 and 74 moves with the carriage 60 in its to and fro motion on the track member 58. Also carried by the carriage plate 60 is the magnetic transducing head 20 previously referred to and hereinafter described in greater detail, such head also partaking of the same movement as the carriage plate 60.

Figure 6:
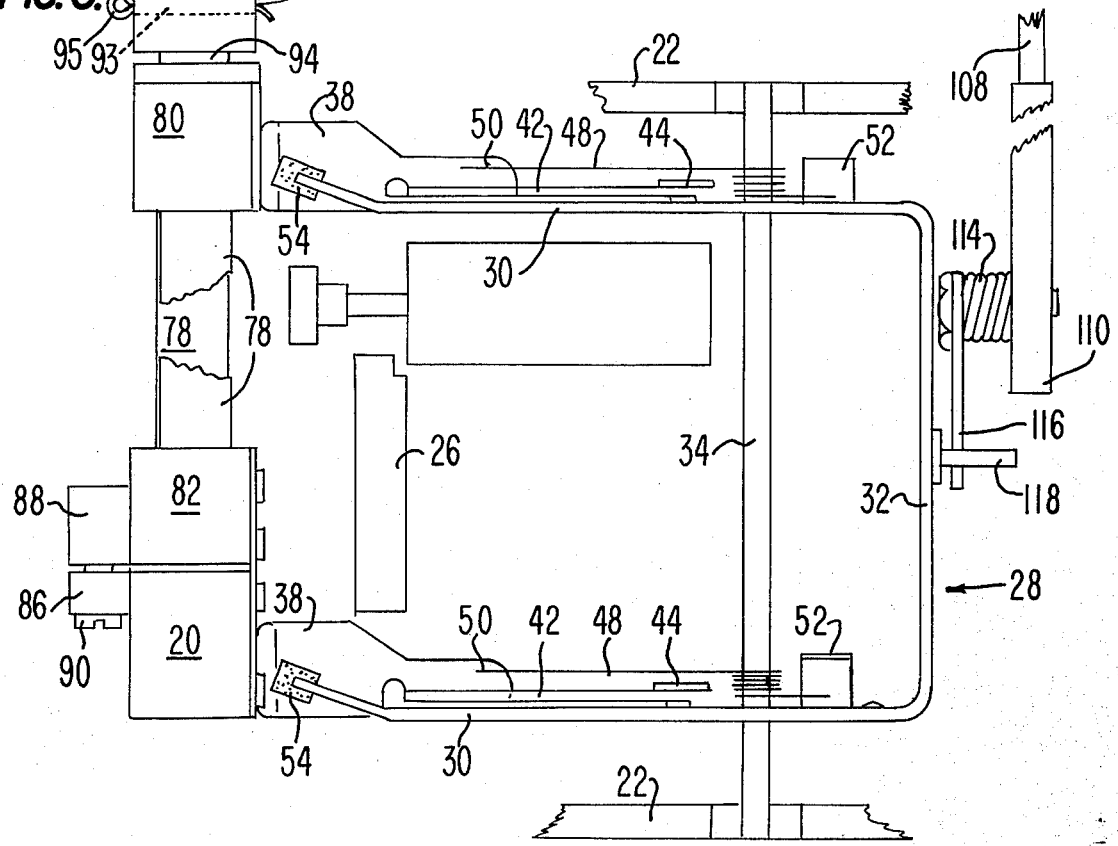
FIG. 6 is a top plan view of the read/write station with the carriage plate removed to better illustrate the passbook gripper mechanism and the head mounting assembly for the magnetic transducing head.

The transducing head 20 is mounted on the extremity of an elongated flexible assembly best illustrated in FIGS. 1, 6 and 7, the opposite end of which is secured to the carriage for joint movement therewith. As will become evident from the following description, this elongated flexible assembly forms a parallelogram linkage system including for part of its length a pair of similarly formed parallel extending flexible metallic blades or flexures 78—78 which, as shown in FIG. 7, connected the head extremity 20 of the assembly to a block 80. The two parallel flexures 78—78 permit the head 20 to be resistingly depressed downwardly to engage the magnetic stripe 14 on the entering edge of a passbook or the like, as previously explained. It is apparent that when the parallelogram linkage system is deflected downwardly to bring the head 20 into engagement with a magnetic stripe, the two blade members 78—78 maintain the parallel relationship between the transducer head 20 and the support block 80 throughout the permitted depressible movement of the head. In this manner the gap of the transducer 92 (FIG. 1) contained in the head 20 is perpendicularly related to the magnetic stripe 14 regardless of the extent of the deflection of the head in its movement toward and in engagement with the stripe.

For the purpose of precisely positioning the surface of the transducing head relative to the magnetic stripe and parallel to the magnetic bits recorded thereon, the head 20 is adjustably connected to an immediate adjacent block 82 at the outer end of the flexure members 78—78 by the provision of a metallic spring strap 84, best shown in FIG. 8, which is connected to the inner side of the head 20 and the block 82. On the opposite or front side of these two members, there is provided adjustable means for varying the angularity of the transducing head 20 with respect to the adjacent block 82, such means including a pair of complementary projections 86 and 88 on the head 20 and block 82, respectively, the projection 88 being provided with internal threads for threadably receiving a screw 90 and the projection 86 being provided with an aperture for receiving the screw 90 therethrough. In order to provide a fine adjustment of the angularity of the transducing head with respect to its mounting on the carriage, the connecting strap 84 should normally provide a slight clearance between the head 20 and the adjacent block 82 as illustrated in FIG. 8. With the provision of this normal clearance, adjustable rotation of the screw 90 in the threads of the projecting body 88 will serve to effectuate accurate alignment of the transducing gap 91 of the magnetic transducer 92 (FIGS. 1 and 7) of the head 20 with the data bits stored on the magnetic stripe 14 as the head traverses the stripe during activation of the carriage.

The leftmost portion of the head mounting assembly, as best illustrated in FIGS. 1 and 7, is comprised of a shaft or pen 94 fixed at one end to side of the block 80 opposite the side thereof supporting the flexures 78—78. The opposite end of the shaft 94 is rotatably mounted in a central aperture or bore formed in a mounting block 96, such block being provided with a flatted extension or tongue 97 best shown in FIG. 1) which is attached to the lip 69 of the carriage plate 60 by means of a pair of screws, the shaft 94, block 80, flexures 78—78 and head 20 being rotatably coupled to the block 96 by means of a retaining clip 99 disposed in a circumferential groove formed in the shaft 94, the retaining clip 99 cooperating with the surface of the block 96 adjacent the tongue 97 to thereby retain the head assembly in axially fixed relationship relative to the block 96 and the carriage plate 60. The shaft 94 is additionally provided with an a transverse aperture 91, and the block 96 provided with an aperture 93 is intersecting its central aperture 96, said apertures 91 and 93 being operable when aligned for receiving a cotter pin 95 that is effective for limiting the rotational movement of the block 80 and head 20 relative to the mounting block 96. The degree of rotation permitted the block 80 and head 20 is accordingly limited by the relative diameter of the shank of the cotter pin 95 and the aperture 93 formed in the mounting block 96, it being understood that the pin 95 is to have a snug fit in the aperture 91 formed in the shaft 94. This limited rotation to permitted the block 80, flexures 78—78 and head 20 allows the transducing head to follow the magnetic stripe even when lateral contours thereon are encountered.

In order to depress the head 20 into engagement with the magnetic stripe 14 on the passbook, the pair of pins 72 and 74 carried by the lever 70 are utilized to force the head downwardly shortly after it commences its movement along its path of travel. This depressing action is performed, as best shown in FIGS. 4 and 5, by the engagement of the inwardly projecting pin 74 of the lever 70 with the underside of a stationary camming member 98 which forms the outer forward extremity of a plate 100 secured to the underside of the interior support 59 upon which the track member 58 is mounted. FIG. 4 illustrates the initial or starting position of the transducing head prior to its engagement with the magnetic stripe of an introduced passbook, and in this position it is evident that the pin 74 is in engagement with the high side of the stationary cam 98. Shortly after the commencement of the travel of the carriage and head, the pin 74 is depressed by the cam 98, thereby causing the lever 70 and its outwardly projecting pin 72 to be lowered to the position illustrated in FIG. 5, the pin 72, in this position, serving to lower the head 20 into engagement with the magnetic stripe on the leading edge portion of the passbook 10.

Instead of effectuating the lowering of the head 20 by direct contact of the pin 72 with the flextures 78, it is preferable to provide a flexible blade member or finger 104 as an intermediary member, such finger 104 is illustrated in FIG. 2 being anchored at one end to the carriage plate 60 by means of a lateral extension 105. The finger 104 overlies the transducer head mounting assembly for substantially the length thereof and is provided at its free end with a dimpled configuration for direct engagement with the head 20 as the projecting pin 72 is lowered by the camming mechanism 98, an intermediate portion of the finger 104 being contacted by the pin 72 to thereby lower the head 20 into engagement with the passbook as the flexures 78—78 yieldably follow. The limited rotational motion of the block 80, flexures 78—78 and head 20, as afforded by the limited rotation of the shaft 94 in the mounting block 96, permits the transducing head to closely track the magnetic stripe even when transverse contours in the stripe are encountered.

The above-referenced gripper mechanism 28 illustrated in FIG. 2 is preferably operated by a solenoid 106 shown in FIGS. 4 and 5 and disposed to the left of the armature 108 shown in FIG. 2, such solenoid being mounted so that its axis extends parallel with the path of movement of the carriage plate 60. Forming a part of this solenoid is the armature 108 which is partially enclosed within an inverted U-shaped member 110, the member 110 also serving to anchor an extremity 112 of a coiled spring 114, an opposite extremity 116 of the spring 114 being fitted through a rectangular opening in a projecting 118 fixed to the cross member 32 of the upper U-shaped jaw member 30—30. In the position of the parts shown in FIG. 4, where the jaws are separated and ready to receive a passbook, the extremity 116 of the coil spring 114 is disposed in the lower portion of the rectangular opening of the extension 118. Upon energization of the solenoid 106, however, the armature 108 is retracted to thereby draw the end 112 of the spring 114 theretoward and to raise the end 116 of the spring as shown in FIG. 5. Elevation of the end 116 of the spring 114 serves to initially lift the rearward end of the upper U-shaped jaw member and to lower the forward extremities of the arms 30—30, the shoes 54—54 thereby gripping the leading edge of the passbook intermediate the shoes 54—54 and the paddle-shaped jaws 38—38. Continued elevation of the end 116 of the spring 114 by the solenoid 106 serves to further raise the rearward ends of the arms 30—30 and to further rotate the arms 30—30 on the rod 34, the slanted slots 36—36 in the arms 30—30 cooperating with the rod 34 to bodily rotate the arms 30—30 of the upper jaw member and the arms 42—42 of the lower jaw member relative to the shaft 34, the shoes 54—54 and the paddle-shaped members 38—38 being accordingly moved rearwardly to abut the leading edge of the passbook against the edge guide 26. It is apparent that the simple straight-line movement of the armature 108 of the solenoid 106 causes the upper set of jaws 54—54 to respond with a compound motion, such pair being initially rocked into gripping relationship with the lower set of jaws 38—38, whereupon both the jaws 54—54 and 38—38 are activated rearwardly to effect a reference position for the leading edge 16 of the passbook.

It will be apparent from the above description that the improved transducing head mounting assembly of the present invention, in conjunction with the passbook read/write station touched upon in the foregoing and described in detail in the referenced U.S. Pat. to Albert C. Williamson, Gunther R. Goetzinger and Hilliard R. DiVeto, No. 3,803,388, will provide apparatus effective for reliably reading data from and writing data on a magnetic stripe disposed on the cover of a bank passbook, and that such reading and writing will in no way be encumbered by the presence of topographical longitudinal or transverse contours on the stripe, the flexured and rotatable mounting of a transducing head in the read/write station assuring ideal tracking of the magnetic stripe by the transducing head.

While a particular embodiment of the inventive head mounting assembly has been shown and described, in a particular environment in a read/write station, it will be understood that various modifications in the mounting assembly itself, and in the applications that may be found therefor, may be devised by those skilled in the art without departing from the true spirit and scope of the invention.

What is claimed is:

1. In a magnetic read/write station having a translatable and resiliently mounted transducing head for reading and writing data from and on a stationarily positioned magnetic stripe predeterminedly fixed to the cover of documentary material such as a bank passbook, said read/write station having also support means, passbook positioning means including an entryway, carriage means for translatably moving said transducing head relative to said support means and along the longitudinal axis of said magnetic stripe, and depression means responsive to the translatable movement of the transducing head relative to the magnetic stripe to establish compressible contact therebetween, improved means for mounting said transducing head on said carriage means whereby said head in addition to being resiliently mounted is rotatable a predetermined distance relative to said carriage means about said longitudinal axis of said magnetic stripe and the compressible contact of the head with the magnetic stripe is automatically adjustable to counteract the effects of linear and transverse topographical contours imparted to the surface of said stripe by variations in the thickness of said passbook, said improved mounting means comprising:
 a. a first body portion having means retainably and adjustably mounting said transducing head,
 b. a pair of parallel extending resilient connecting members having one of their respective extremities coupled to said first body portion, said connecting members extending parallel to the longitudinal axis of said magnetic stripe
 c. a second body portion having one side thereof coupled to the opposite extremities of said pair of resilient connecting members, said second body portion being provided with a cylindrical shaft extending parallel to the longitudinal axis of said magnetic stripe and fixed to the opposite side thereof from the side coupled to said pair of resilient connecting members, and
 d. a mounting member connected to said carriage means and having a first cylindrical aperture receiving said cylindrical shaft of said second body portion and having means rotatably retaining said cylindrical shaft within said aperture such that said second body portion, said pair of parallel resilient connecting members, said first body portion and said transducing head are rotatable a predetermined distance relative to said longitudinal axis of said magnetic stripe as said transducing head is translatably moved by said carriage means while in said compressible contact with said magnetic stripe, said predetermined rotational motion serving to uniformly maintain said compressible contact even when said transducing head encounters topographical contours on the surface of said magnetic stripe.

2. The improved mounting means for a transducing head defined in claim 1 wherein said mounting member comprises:
 a. an apertured tongue portion by means of which said mounting member is connected to said carriage means as by means of screws communicating with the apertures thereof and cooperating with threaded apertures formed in said carriage means, said tongue portion having a first surface connectably abutting against said carriage means and a second surface opposite said first surface against which the heads of said screws abuttably limit, and
 b. a third body portion extending outwardly of said second surface of said tongue portion, said third body portion having a first dimension paralleling said first and said second surfaces of said tongue portion and a second dimension defining the extension of said third body portion outwardly of said second surface of said tongue portion, said second dimension of said third body portion complementing the thickness of said apertured tongue portion to define a predetermined outwardly extending dimension of said mounting member.

3. The improved mounting means for a transducing head defined in claim 2 wherein said predetermined outwardly extending dimension of said mounting member is greater than the corresponding dimension of said second body portion.

4. The improved mounting means for a transducing head defined in claim 2 wherein said first cylindrical aperture of said mounting member extends through said first dimension of said third body portion and wherein said mounting member is additionally provided with a second cylindrical aperture extending through said predetermined outwardly extending dimension thereof and intersecting said first cylindrical aperture.

5. The improved mounting means for a transducing head defined in claim 4 wherein said cylindrical shaft of said second body portion is provided with a third cylindrical aperture transversely disposed thereof and a circumferential groove disposed adjacent the outermost extremity thereof remote from said second body portion, said groove being provided with a retaining clip disposed therewithin and in cooperating relationship with the surface of said second dimension of said third body portion adjacent said tongue portion such as to rotatably retain said second body portion and said transducing head relative to said mounting member and said carriage means.

6. The improved mounting means for a transducing head defined in claim 5 wherein said second cylindrical aperture of said mounting member is of predetermined greater diameter than said third cylindrical aperture of said cylindrical shaft, and wherein said third cylindrical aperture is provided with a snugly fitted pin extending through said second cylindrical aperture such that said second body portion and said resiliently mounted transducing head are permitted a predetermined angular rotational displacement relative to said mounting member and said carriage means to thereby uniformly maintain said compressible contact of said transducing head with said magnetic stripe even when said transducing head encounters topographical contours on the surface of said stripe.

7. The improved mounting means for a transducing head defined in claim 2 wherein the adjustable coupling between said transducing head and said first body portion of said mounting means is accommodated by means of:
 a. a metallic spring strap connected to corresponding side surfaces of said transducing head and said first body portion, said side surfaces being adjacent said support means,
 b. an apertured first projection connected to the side surface of said transducing head opposite the surface thereof to which said spring strap is connected,
 c. an apertured second projection connected to the side surface of said first body portion opposite the surface thereof to which said spring strap is connected, and
 d. a screw communicating with the aperture of said first projection and adjustably cooperating with threads formed in the aperture of said second projection to thereby permit angular adjustment of said transducing head relative to said first body portion.

8. The improved mounting means for a transducing head defined in claim 1 wherein said pair of parallel extending resilient connecting members coupled to said first body portion and to said second body portion are flexure members responsive to said depression means of said read/write station to thereby establish said compressible contact of said transducing head with said magnetic stripe of said passbook as said carriage means and said transducing head are translatably activated relative to said support means.

9. An improved head mounting assembly for resiliently and rotatably mounting a translatably movable transducing head in a read/write station, whereby said head may be held in uniform compressible contact with a stationarily positioned magnetic stripe predeterminedly fixed to a passbook or the like during the translation of the head along the longitudinal axis of the stripe, and whereby a said unform compressible contact may be maintained irrespective of topographical contours that may be imparted to the surface of the stripe by reason of variations in the thickness of the passbook, said head mounting assembly comprising, in combination:
  a. carriage means providing for translatable movement relative to said read/write station and to a passbook stationarily positioned thereby, and parallel to the longitude axis of said magnetic stripe
  b. a mounting member connected to said carriage means for translatable movement therewith, said mounting member having a first cylindrical aperture,
  c. a first body portion coupled to said mounting member having means for providing rotational movement of said first body portion about an axis parallel to said longitudinal axis of said magnetic stripe, said means including a cylindrical shaft cooperably disposed in said first cylindrical aperture of said mounting member,
  d. a pair of parallel flexure members connected to said first body portion on the side thereof opposite the side adjacent said mounting member and extending parallel to said longitudinal axis of said magnetic stripe,
  e. a second body portion having means retainably and adjustably mounting said transducing head and connected to said pair of flexure members at the extremities thereof opposite the extremities connected to said first body portion, the cooperation of said cylindrical shaft and said first cylindrical aperture permitting a predetermined rotational movement of said first body portion, said second body portion and said transducing head relative to said mounting member and about an axis parallel to said longitudinal axis of said magnetic stripe, and
  f. depression means associated with said read/write station and responsive to the translatable movement of said carriage means to depressibly lower said transducing head into compressible contacting relationship with said magnetic stripe as yieldably enabled by said pair of flexure members.

10. The improved head mounting assembly defined in claim 9 wherein said mounting member comprises:
  a. an apertured tongue portion by means of which said mounting member is connected to said carriage means as by means of screws communicating with the apertures thereof and cooperating with threaded apertures formed in said carriage means, said tongue portion having a first surface connectably abutting against said carriage means and a second surface opposite said first surface against which the heads of said screws abuttably limit, and
  b. a third body portion extending outwardly of said second surface of said tongue portion, said third body portion having a first dimension paralleling said first and said second surfaces of said tongue portion and a second dimension defining the extension of said third body portion outwardly of said second surface of said tongue portion, said second dimension of said third body portion complementing the thickness of said apertured tongue portion to define a predetermined outwardly extending dimension of said mounting member.

11. The improved head mounting assembly defined in claim 10 wherein said cylindrical shaft of said first body portion is provided with a second cylindrical aperture transversely disposed thereof and a circumferential groove disposed adjacent the outermost extremity thereof remote from said first body portion, said groove being provided with a retaining clip disposed therewithin and in cooperating relationship with the surface of said second dimension of said third body portion adjacent said tongue portion such as to rotatably retain said first body portion and said transducing head relative to said mounting member and said carriage means.

12. The improved head mounting assembly defined in claim 11 wherein said predetermined outwardly extending dimension of said mounting member is greater than the corresponding dimension of said first body portion.

13. The improved head mounting assembly defined in claim 11 wherein said first cylindrical aperture of said mounting member extends through said first dimension of said third body portion and wherein said mounting member is additionally provided with a third cylindrical aperture extending through said predetermined outwardly extending dimension thereof and intersecting said first cylindrical aperture.

14. The improved head mounting assembly defined in claim 13 wherein said retaining clip disposed within said cicumferential groove of said cylindrical shaft of said first body portion cooperates with the surface of said second dimension of said third body portion adjacent said tongue portion to thereby rotatably retain said first body portion and said transducing head relative to said mounting member and said carriage means.

15. The improved head mounting assembly defined in claim 14 wherein said third cylindrical aperture of said mounting member is of predetermined greater diameter than said second cylindrical aperture of said cylindrical shaft, and wherein said second cylindrical aperture is provided with a snugly fitted pin extending through said third cylindrical aperture such that said first body portion and said transducing head are permitted a predetermined angular rotational displacement relative to said mounting member and said carriage means to thereby uniformly maintain said compressible contact of said transducing head with said magnetic stripe even when said transducing head encounters topographical contours on the surface of said magnetic stripe.

16. The improved head mounting assembly defined in claim 10 wherein the adjustable coupling between said transducing head and said second body portion is accommodated by means of:
  a. a metallic spring strap connected to corresponding side surfaces of said transducing head and said second body portion, said side surfaces being contiguously adjacent said carriage means,
  b. an apertured first projection connected to the side surface of said transducing head opposite the surface thereof to which said spring strap is connected,
  c. an apertured second projection connected to the side surface of said second body portion opposite the surface thereof to which said spring strap is connected, and
  d. a screw communicating with the aperture of said first projection and adjustably cooperating with threads formed in the aperture of said second projection to thereby permit angular adjustment of said transducing head relative to said second body portion.

17. The improved head mounting assembly defined in claim 9 wherein said pair of parallel flexure members connected to said first body portion and to said second body portion are yieldably responsive to said depression means of said read/write station to thereby enable the establishment of said compressible contact of said transducing head with said magnetic stripe of said passbook as said carriage means and said transducing head are translatably activated relative to said read/write station.

18. A magnetic transducing head assembly comprising, in combination:
  a first body containing a transducing head for performing magnetic transductions on a magnetizable surface as said first body is translatably moved along the longitudinal axis thereof;
  a second body spaced from the first body;
  a pair of similarly shaped members bridging the distance between the first and second bodies in spaced parallel relation to one another and having their respective opposite ends secured in said bodies to form a parallelogram linkage system in which the first body containing the transducing head forms one side thereof and the second body forms the opposite side thereof, said bridging members permitting deflectable movement of the first body relative to the second body without altering the parallel relation existing therebetween;
  a third body positioned on the side of the second body opposite to the first body; and
  means forming a journal mount between the second and third bodies and providing limited rotation of said parallelogram linkage system about an axis extending substantially parallel to the plane of the linkage system and to the longitudinal axis of said magnetic surface, said journal mount means comprising a pin having one end fixedly secured to one of either of said second or third bodies and the other end disposed in a cylindrical aperture formed in the other of said second or third bodies and means rotatably retaining said pin within said aperture, said journal mount permitting rotation of said parallelogram linkage system relative to said third body.

19. The magnetic transducing head assembly defined in claim 18 wherein said similarly shaped bridging members are blade-like flexures.

20. A magnetic transducing head assembly comprising, in combination:
  a first body containing a transducing head for performing magnetic transductions on a magnetizable surface as said first body is translatably moved along the longitudinal axis thereof;
  a second body spaced from the first body;
  a pair of similarly shaped flexure members bridging the distance between the first and second bodies in spaced parallel relation to one another and having their respective opposite ends secured in said bodies to form a parallelogram linkage system in which the first body is deflectably movable relative to the second body without altering its parallel relationship thereto;
  a third body positioned on the side of the second body opposite to the first body; and
  means journaling the second body to the third body for rotation about an axis extending longitudinally of the pair of flexure members and the longitudinal axis of said magnetizable surface, said journaling means including a pin having one end fixedly secured to one of either the second body or the third body and having the other end disposed in a cylindrical aperture formed in the other of said bodies, and means rotatably retaining said pin within said aperture whereby a rocking motion is permitted said parallelogram linkage system relative to said longitudinal axis of said magnetizable surface to enable the transducing head to follow closely any surface irregularities therein against which it is yieldly pressed by the deflectable movement of the parallelogram linkage system.

21. In combination with the magnetic transducing head assembly defined in claim 20, the provision of means for bodily moving the transducing head assembly along a prescribed path of travel corresponding to the longitudinal axis of said magnetizable surface, and means responsive to such bodily movement for deflecting the parallelogram linkage system in the direction of said magnetizable surface such that said transducing head contained in said first body is pressed into engagement with said magnetizable surface.

22. The mechanism as defined in claim 21 characterized in that said means for deflecting the parallelogram linkage system includes a stationary cam disposed alongside said prescribed path of travel of said transducing head assembly and a cam following member coupled to said transducing head assembly and effective for depressibly activating said first body of the assembly such that said transducing head is pressed into engagement with said magnetizable surface when said assembly is bodily moved along said prescribed path of travel.

23. A magnetic transducing head assembly comprising, in combination:
  a first body containing a transducing head for performing magnetic transductions on a magnetizable surface as said first body is translatably moved along the longitudinal axis thereof;
  a second body spaced from the first body;
  at least one flexure member bridging the distance between the first and second bodies and having its opposite end secured to said bodies to form a flexible connection therebetween which enables the first body to be deflected relative to the second body toward and into engagement with said magnetizable surface;

means for deflecting the first body such that said transducing head is moved into engagement with said magnetizable surface;

a third body positioned on the side of the second body opposite to the first body; and means journaling the second body to the third body for rotation about an axis extending in a direction longitudinally of the flexure member and of the longitudinal axis of said magnetizable surface, said journaling means including a pin having one end secured to one of either the second body or the third body and having the other end disposed in a cylindrical aperture formed in the other of said bodies, and means rotatably retaining said pin within said aperture. whereby a rocking motion is permitted the second body relative to the longitudinal axis of said magnetizable surface to thereby enable the transducing head to closely follow any traverse surface irregularities therein.

* * * * *